United States Patent [19]

Barbezat et al.

[11] Patent Number: 5,094,911
[45] Date of Patent: Mar. 10, 1992

[54] METAL PAPER GLAZING ROLLER FOR A PAPER MACHINE

[75] Inventors: Gerard Barbezat, Zell; Bruno Walser, Raterschen, both of Switzerland

[73] Assignee: Sulzer Brothers Limited, Winterthur, Switzerland

[21] Appl. No.: 331,252

[22] Filed: Mar. 30, 1989

[30] Foreign Application Priority Data

Apr. 13, 1988 [CH] Switzerland .................. 1361/88

[51] Int. Cl.⁵ ..................... B32B 3/00; B32B 15/00
[52] U.S. Cl. ........................... 428/336; 428/334; 428/375; 428/379; 29/110; 29/132
[58] Field of Search ............ 428/379, 389, 390, 391, 428/364, 375, 336, 334; 29/132, 110, 895.32

[56] References Cited

U.S. PATENT DOCUMENTS

| 1,787,890 | 1/1931 | Woodward | 29/132 |
| 3,942,230 | 3/1976 | Nalband | 29/132 |
| 4,272,873 | 6/1981 | Dietrich | 29/132 |
| 4,691,420 | 9/1987 | Schiel | 29/132 |
| 4,704,776 | 11/1987 | Watanabe et al. | 29/132 |
| 4,975,153 | 12/1990 | Nelson et al. | 29/132 |
| 4,989,306 | 2/1991 | Leino et al. | 29/132 |

FOREIGN PATENT DOCUMENTS

| 1187270 | 5/1985 | Canada |
| 0363025 | 12/1931 | United Kingdom |
| 1042987 | 9/1966 | United Kingdom |
| 2180624 | 4/1987 | United Kingdom |

Primary Examiner—George F. Lesmes
Assistant Examiner—J. M. Gray
Attorney, Agent, or Firm—Kenyon & Kenyon

[57] ABSTRACT

An at least substantially amorphous granite layer is applied thermally onto a metal roller in order to form a glazing surface on the roller for use in a papermaking machine. The particles of the granite layer are applied using a plasma jet with the particles being fused in the plasma jet and accelerated onto the substrate formed by the peripheral surface of the roller.

6 Claims, 1 Drawing Sheet

METAL PAPER GLAZING ROLLER FOR A PAPER MACHINE

This invention relates to a metal paper glazing roller for a papermaking machine, and more particularly to a metal paper glazing roller having a glazing surface formed of granite powder.

Paper glazing rollers for papermaking machines are known, in which the glazing surfaces consists of synthetic or artificial granite (M. Suguri et al: "Study on artificial granite roll with improved releasing ability for wet paper"; Japan Pulp & Paper, Aug., 1873, pages 77 to 84). In these known rollers, the glazing surface consists of stone powder, the main constituents of which are feldspar and quartz. In addition, a special polyurethane which is not described in detail is used as a binder to bind the individual powder particles together. However, the adhesively bonded stone powders have not been formed with a homogenous structure over the entire surface of a roller. As a result, in many cases, the rollers are subject to relatively low wear strength and short life.

British Patent 363,025 describes a roll for a papermaking machine which has a surface formed of minute pieces of rock embedded in a binder consisting of vulcanised rubber. British Patent 2,180,624 describes a press roll which uses a metal coating instead of a granite roll.

Other types of rolls have also been known, for example, U.S. Pat. No. 3,942,230 describes a composite metallic roll having a porous plating formed by a flame spray process and an outer layer of fluorocarbon. In use, the composite metallic roll tends to gradually expose or release the fluorocarbon over a predetermined life whereby to provide release properties. Relative to rollers with glazing surfaces consisting of stone powders, the wear strength of such a composite metallic roll is relatively low. British Patent 1,042,987 describes a roller of silica having a surface covered with a smooth sheath of refractory material.

It is an object of the invention to improve the mechanical properties of the synthetic granite coating of a metal paper glazing roller.

It is another object of the invention to improve the wear strength of a metal paper glazing roller.

It is another object of the invention to facilitate the release of a wet paper from a metal paper glazing roller having a granite surface.

Briefly, the invention provides a paper glazing roller for a paper making machine which is formed of a metal substrate in the form of a roller barrel and a glazing surface on the substrate consisting of an at least substantially amorphous, i.e. substantially non-crystallized granite layer which has been thermally sprayed onto the substrate.

The substantially amorphous granite layer which is applied thermally, mainly by plasma spraying, has a much more homogeneous structure than layers in which powders are bonded by adhesives, the structure being uniform and regular over the entire surface. This results in relatively high wear strength and long life. In addition, a layer applied by thermal spraying has a certain porosity which is advantageously between 3 and 15 percent by volume. This porosity promotes and favors the release of glazed paper webs from the roller.

The substantially amorphous structure is achieved by high cooling and solidification speeds of a liquefied granite powder, which is sprayed thermally onto a generally steel roller barrel. The fact that this structure is substantially amorphous can be proved in known manner, e.g. by X-ray fine-structure analyses. One possibility of achieving a required cooling speed is, for example, to so co-ordinate the mass of the metal substrate, the thickness of the granite coating and/or the temperature and/or the speed of travel of a plasma beam relatively to the substrate that the roller mass guarantees an adequately quick heat dissipation.

The composition of the flame or plasma beam, which is free of oxygen and, for example, may consist of an argon/hydrogen mixture, the control of the beam temperature and the location and nature of the introduction of the ground granite powder into the plasma beam may advantageously be so selected and/or influenced that the chemical composition in the sprayed-on layer corresponds at least as substantially as possible to the composition of the original powder.

These and other objects and advantages of the invention will become more apparent from the following detailed description taken in conjunction with the accompanying drawings wherein.

Figure 1:
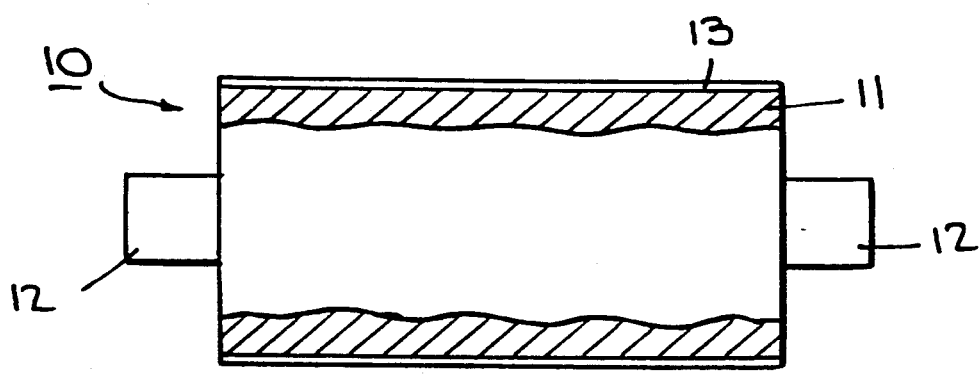
FIG. 1 illustrates a part cross sectional view of a blazing roller constructed in accordance with the invention.
Figure 2:
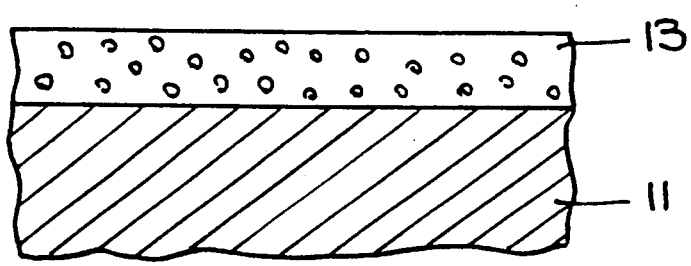
FIG. 2 illustrates a part-cross sectional view of a glazing roller constructed in accordance with the invention.

Referring to FIG. 1, the paper glazing roller 10 is constructed of a solid roller barrel 11 of normalized unalloyed Structural Steel 37 having a diameter of 40 millimeters with a stub shaft 12 at each end as well as a glazing layer 13. Alternatively, the roller barrel 11 may be hollow, in which case, the wall thickness of the barrel should be at least 10 millimeters in order to ensure that the glazing layer 13 which is applied in a thermally sprayed-on manner cools sufficiently quickly for an amorphous structure to form.

The peripheral surface of the roller 11 to be coated may, if required, be roughened and activated by sand blasting with corundum ($Al_2O_3$) particles to improve the adhesion of the sprayed-on layer.

The granite powder for spraying consists of a natural granite which contains basically quartz ($SiO_2$), plagioclase (($NaCa$) $Al_2Si_2O_8$) and potash feldspar (($K$, $Na$) $AlSi_3O_8$) and which has been processed into a powder of particle sizes ranging from 20 to 60 $\mu$m by grinding and screening. Experiments have shown that these particle sizes enable the best results for amorphous granite layers to be reproducibly achieved in the installation used under the conditions selected. Larger particle sizes up to about 100 $\mu$m are permissible, but give fairly considerable fluctuations relative to the reproducibility of the layers.

Figure 3:
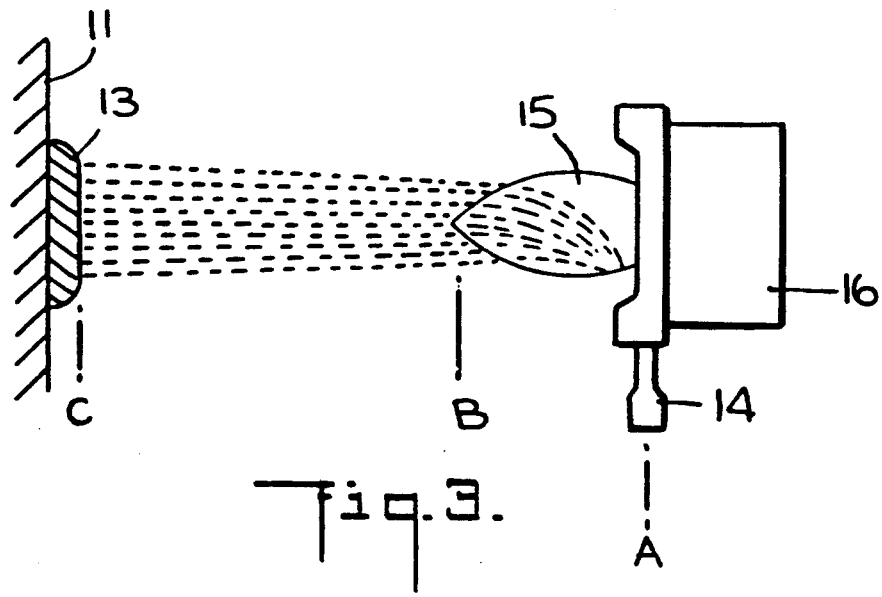
FIG. 3 illustrates schematic view of a plasma spraying process in accordance with the invention.

Referring to FIG. 3, the granite powder limited to the above particle sizes is introduced by means of a commercial powder feeder 14 into a plasma jet (beam) 15 in a zone A of a plasma spray installation for example, a Model A 2000 of Plasmatechnik AG, Wohlon, Switzerland available on the market. The powder particles are fused in this jet 15 and projected through a plasma spray gun nozzle outlet (not shown) toward the substrate with high acceleration and speed from a zone B at the tip of the jet 15. The hot particles impact on the substrate 11 in a zone C and solidify thereon to form the layer 13.

The following parameters are set in the installation to achieve an amorphous granite structure:

Gas supply:

Argon (Ar) 40 Liters/minute (l/min)

Hydrogen ($H_2$) 10 liters/minute(l/min)

Current: I=650 amps (A)

Voltage: V=75 volts (V)

The powder is injected transversely, i.e. at an angle of 90° to the plasma beam at a distance of about 10 to 15 millimeters (mm) in front of the plasma spray gun nozzle outlet. The distance between the nozzle inlet and the substrate is about 70 millimeters (mm). The residence time of the powder in the plasma beam is thus extremely short and is about 0.2 to 1 milliseconds (Mms). The crystalline structure of the granite powder must have completely fused within that time in order to give an amorphous structure to the coating. High plasma beam temperatures are therefore required and may assume values between 5000° and 10000° K. in the powder particle "flight path".

A uniform granite layer 13 of 0.05 millimeter (mm) thickness is obtained, in a single pass, by rotation of the substrate about a horizontal axis at a circumferential speed of 30 meters/minutes (m/min) and a uniform lateral movement of the spray gun with a feed of 5 millimeters (mm) per revolution about the horizontal axis, the cooling speed being about 500 meters/second (m/sec). The layer thickness can be varied within certain limits by raising the speed of rotation of the substrate. Repeated passes give a final granite layer thickness of 0.5 millimeters (mm) with a porosity is about 5 percent by volume.

Temperature measurements of the coated surface and the interior of the substrate immediately after the setting of the granite layer gave the following values:

At the surface: 200° C.

In the substrate, max: 150° C.

No overheating of the layer and/or the substrate was therefore observed.

The above-mentioned analysis of the layer by X-ray fine structure analysis shows a relatively smooth layer surface with a structure which is about 95% amorphous. An analysis of the composition of the layer shows that the composition has remained practically unchanged in comparison with the initial powder.

The invention thus provides a relatively simple technique for the formation of a glazing surface on a metal roller in order to produce a metal paper glazing roller for a papermaking machine. Due to the amorphous structure of the thermally applied layer, the mechanical properties of the layer, such as the wear strength and useful life are enhanced. In addition, the structure of the synthetic granite coating facilitates the release of a wet paper from the roller when in use.

We claim:

1. A paper glazing roller comprising
   a metal roller barrel; and
   a thermally sprayed layer of amorphous granite powder on said roller barrel.

2. A paper glazing roller as set forth in claim 1 wherein said layer is of a thickness of from 0.05 to 1 millimeter.

3. A paper glazing roller as set forth in claim 1 wherein said layer is of a thickness of from 0.1 to 0.6 millimeters.

4. A paper glazing roller as set forth in claim 1 wherein said layer has a porosity of from 3 to 15% by volume.

5. A paper glazing roller as set forth in claim 1 wherein said layer has a porosity of from 5 to 8% by volume.

6. A paper glazing roller comprising
   a metal roller barrel; and
   a thermally sprayed layer of non-crystallized granite powder on said roller barrel, said layer having a porosity of from 3 to 15% by volume to promote release of glazed paper webs therefrom and having a structure about 95% amorphous.

* * * * *